United States Patent
Kvetny et al.

(10) Patent No.: US 9,576,479 B2
(45) Date of Patent: Feb. 21, 2017

(54) ROAD CROSSING ASSISTANCE FOR THE VISUALLY IMPAIRED USING TWO TRANSMITTED MESSAGES FROM BEACONS

(71) Applicant: Intel IP Corporation, Santa Clara, CA (US)

(72) Inventors: Eddy Kvetny, Rishon-Lezion (IL); Raan Kahn, Beit-Yitzhak (IL); Nachman Cohen, Kfar-Saba (IL); Ilan Carmel, Petah-Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 63 days.

(21) Appl. No.: 14/566,165

(22) Filed: Dec. 10, 2014

(65) Prior Publication Data

US 2016/0171883 A1    Jun. 16, 2016

(51) Int. Cl.
*G08B 21/00* (2006.01)
*G08G 1/005* (2006.01)
*G09B 21/00* (2006.01)

(52) U.S. Cl.
CPC .......... *G08G 1/005* (2013.01); *G09B 21/001* (2013.01); *G09B 21/007* (2013.01)

(58) Field of Classification Search
CPC ..................................................... G08G 1/005
USPC ............................... 340/944, 4.1, 4.12, 4.13
See application file for complete search history.

(56) References Cited

U.S. PATENT DOCUMENTS 9,008,859 B2 *    4/2015   Herzog ............. G01C 21/3652
340/407.1

\* cited by examiner

*Primary Examiner* — Jeffery Hofsass

(57) ABSTRACT

Disclosed herein are techniques and systems to guide a visually impaired user through an urban area, such as, across a crosswalk. A mobile device may receive messages broadcast by wireless beacons deployed in an area and determine a path, for example, across a crosswalk, based on the messages. The mobile device can then provide feedback to guide a visually impaired user across the crosswalk.

22 Claims, 9 Drawing Sheets

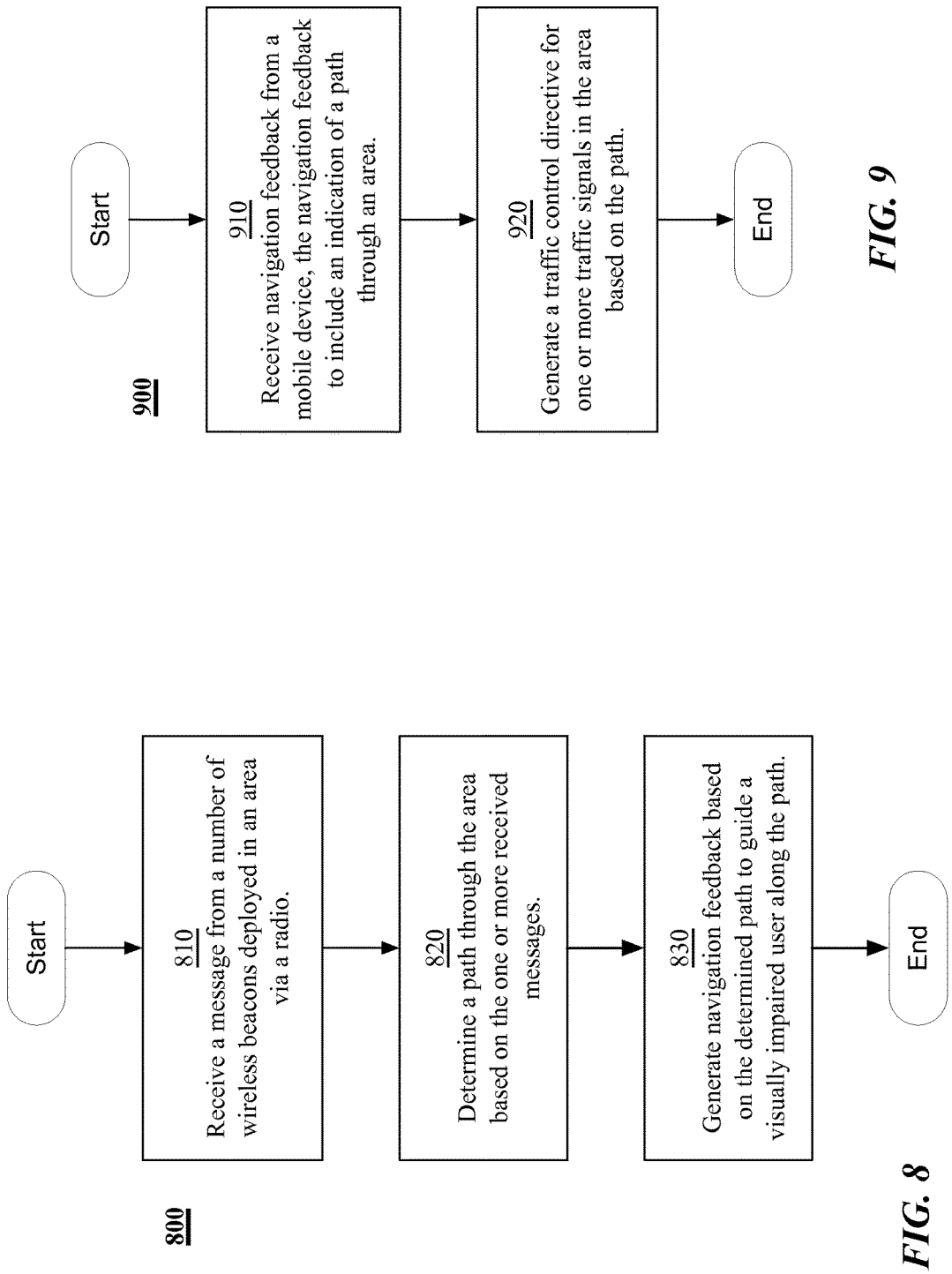

ROAD CROSSING ASSISTANCE FOR THE VISUALLY IMPAIRED USING TWO TRANSMITTED MESSAGES FROM BEACONS

TECHNICAL FIELD

Embodiments described herein generally relate to wireless systems and particularly to systems for assisting visually impaired users cross a road.

BACKGROUND

Some estimates indicate there are approximately 40 million people who are blind and approximately 290 million people who are visually impaired worldwide. One of the challenges for blind and/or visually impaired users is navigating urban areas. Particularly difficult is navigating urban areas the blind and/or visually impaired person is unfamiliar with. It is noted, there are a number of difficult and potentially dangerous areas for a person to navigate, one of which is crossing a road.

Traditionally, blind and visually impaired users are assisted with crossing a road by audio guidance that is triggered by pressing a button. For example, at a crosswalk, a button may be present that allows a person to indicate an intent to cross the road (e.g., by pressing the button). Pressing the button may trigger an audible indication at a particular time to alert the person that the lights are such that crossing the street is appropriate at that time. However, some research suggests that only 16 percent of blind and visually impaired users are able to find the crosswalk button. Furthermore, when the button is found and pressed, 27 percent of the time, the blind and visually impaired persons is still in the crosswalk when the traffic lights change, due, for example, to the difficulty in finding the crosswalk area, the start of the audible signal, or the like.

This can present a major challenge for blind and/or visually impaired users, particularly in major metropolitan areas where there are hundreds of thousands of crosswalks and a person may navigate multiple crosswalks in a single trip through the urban area. The present disclosure is directed to the above.

BRIEF DESCRIPTION OF THE DRAWINGS

FIGS. 8-9 illustrates logic flows for assisting a visually impaired user with navigating an area.

DETAILED DESCRIPTION

Figure 1:
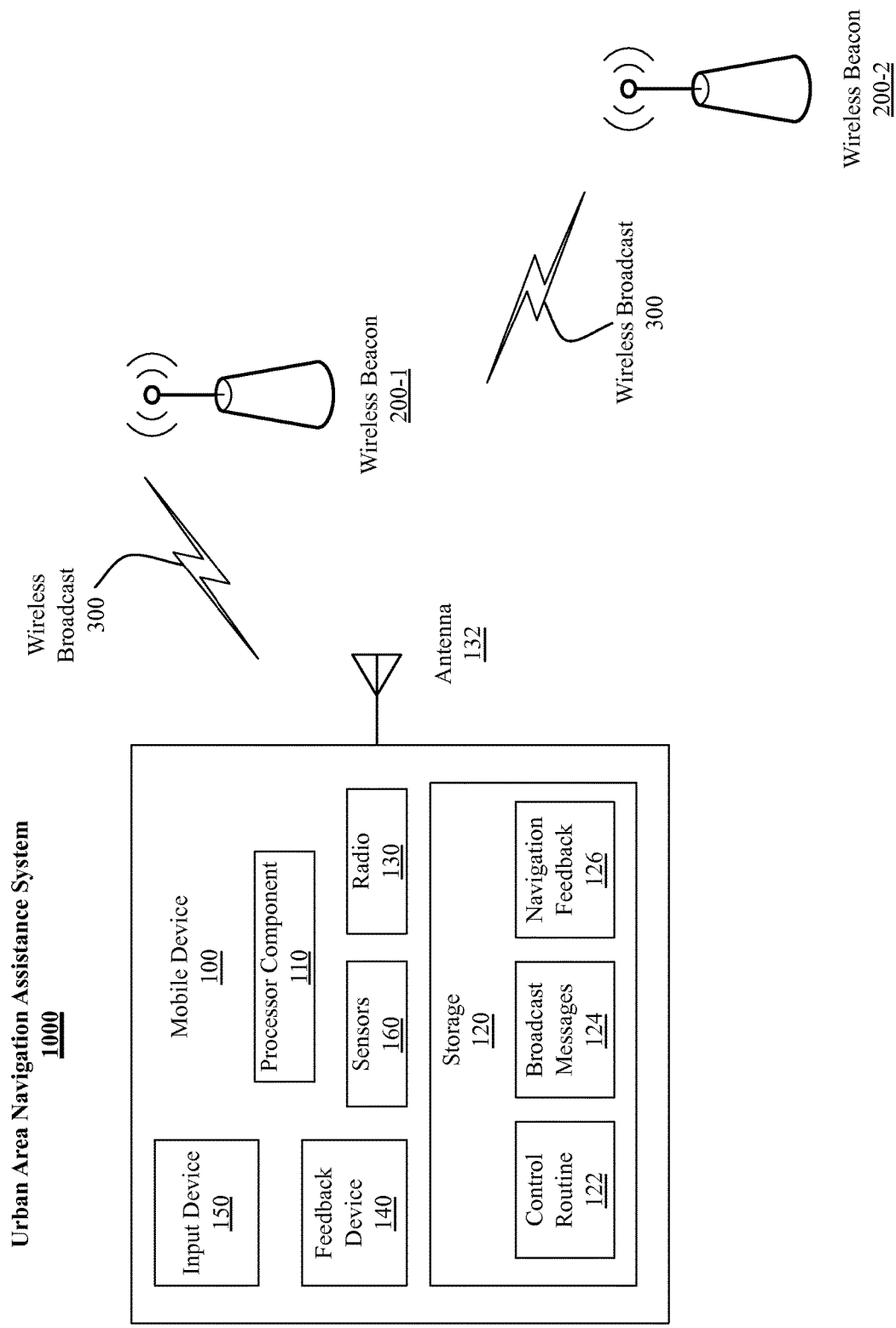
FIGS. 1-3 illustrate embodiments of a visually impaired navigation assistance system.

Examples disclosed herein are generally directed to wireless systems that are implemented to facilitate proximity based detection of blind or visually impaired users and assist them in crossing a crosswalk. For example, wireless beacons may be implemented adjacent to a crosswalk area. A user may carry a mobile device (e.g., smartphone, or the like) configured to detect broadcasts from the wireless beacons. Based on the broadcasts, the mobile device may guide the user to the crosswalk area and across the street. Furthermore, the mobile device may be configured to interact with the wireless beacons to ensure the lights remain favorable for a user crossing the street while the user is in the crosswalk area.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Reference is made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 is a block diagram of an urban area navigation assistance system 1000. It is important to note, various examples discussed herein are applicable to a system to assist a blind and/or visually impaired user with navigating an urban area, such as, for example, crossing a street at a crosswalk. It is to be appreciated, that although the examples discussed herein are used in the context of crossing a street, other urban area navigation may be accomplished, such as, for example, navigating through a specific area (e.g., a park, a zoo, a museum, a shopping mall, or the like). As another example, the system 1000 may be implemented to direct a blind and/or visually impaired person to a specific location (e.g., a bus stop, an ATM machine, a storefront, or the like). As used herein, an "urban area" shall mean a geographic area, or a particular physical space and not be necessarily limited to areas defined as "urban" based on a particular population or density. Furthermore, although the systems and methods described herein are particularly adapted to assisting blind and/or visually impaired users, they may be implemented to assist any user, whether visually impaired or not, with navigating an area, such, as, an urban area. However, in discussing a user of the system 1000, a visually impaired user is used for example purposes only.

The system 1000 includes a mobile device 100 and a number of wireless beacons 200-*a*, where "a" is a positive integer. The wireless beacons 200-*a* are deployed in an urban area (refer to FIG. 7). It is noted, that a limited number of wireless beacons 200-*a* are shown for purposes of clarity. Specifically, wireless beacons 200-1 and 200-2 are shown. However, it is to be appreciated, that any number of wireless beacons 200-*a* may be implemented.

In general, the mobile device 100 is configured to receive wireless broadcasts from the wireless beacons 200-1 and 200-2 and to guide a user (e.g., a visually impaired user of the mobile device, or the like) through the urban area based on the received wireless broadcasts. The mobile device 100 may be any of a variety of mobile computing devices, such as, for example, a smartphone, a tablet computer, a wearable computing device, or the like. As a particular, example, the mobile device may be a smartphone carried by a visually impaired user. An application may be executing on the smartphone. The application may repeatedly scan a particular wireless frequency and/or channel, such as, for example, Bluetooth Low Energy (BLE). Due to scanning the BLE frequency, the application may receive wireless broadcasts from the beacons deployed in the urban area and proceed to guide the visually impaired user through the urban area based on the broadcasts. This and other examples will be described in greater detail below.

The mobile device 100 may include one or more of the following: a processing component 110, storage 120, a radio 130, an antenna 132, a feedback device 140, an input device 150, and sensors 160. The storage 120 may store one or more of a control routine 122, broadcast messages 124, and navigation feedback 126. As depicted, the mobile device 100 and the wireless beacons 200-a may exchange signals conveying broadcast messages 124 through a wireless broadcasts 300.

In general, the wireless broadcasts 300 may be any of a variety of wireless communication schemes, technologies, or techniques. With some examples, the wireless broadcasts 300 may be any wireless communication technique suitable for communicating between the mobile device 100 and the wireless beacons 200-1 and 200-2. For example, the wireless broadcasts 300 may be implemented according to one or more Institute of Electrical and Electronics Engineers (IEEE) 802.11 standards, one or more IEEE 802.15 standards, or similar. For example, the wireless broadcasts 300 may be a Wi-Fi Direct broadcast, a Bluetooth broadcast, a BLE broadcast, an RFID broadcast, a ZigBee broadcast, an Ultrasound broadcast, or the like. Accordingly, the radio 130 may be any radio configured to communicate via the broadcast 300. For example, the radio 130 may be a Wi-Fi Direct radio, a Bluetooth radio, a BLE radio, an RFID radio, a ZigBee radio, an Ultrasound radio, or the like.

During operation, the mobile device 100 is configured to receive broadcasts from the wireless beacons 200-1 and 200-2. For example, the mobile device 100 can receive broadcasts 300 from the wireless beacons 200-1 and 200-2. In particular, the mobile device 100 can receive broadcast messages 124 from the wireless beacons 200-1 and 200-2 via the radio 130 and antenna 132.

Additionally, the mobile device 100 is configured to determine a path (refer to FIG. 7) through an area based on the received broadcasts. For example, the processor component 110 can determine the path based on the received broadcast messages 124. The mobile device 100 may generate navigation feedback based on the determined path and send a control directive to the feedback device 140 to provide the navigation feedback 126 to a user. In general, the navigation feedback includes an indication of the path to guide a visually impaired user along the determined path (e.g., between the wireless beacons, from a wireless beacon to another wireless beacon, or the like). Various examples are provided in conjunction with FIG. 7 below.

With some examples, the navigation feedback 126 may include an indication comprising a query as to whether to traverse the determined path or not. For example, the processor component 110 may generate the navigation feedback to include a question for the visually impaired user about whether the user desires to traverse the determined path. The mobile device 100 may receive input from a user (e.g., via the input device 150). For example, the processor component may receive an indication from the input device 150, the indication comprising a request to traverse the path or comprising an indication the request to traverse the path is declined.

With some examples, the mobile device 100 may determine a number of possible paths to take based on the broadcasts messages. For example, a visually impaired user at a four-way intersection may cross one of two streets or may proceed along the sidewalk of one of the streets. Accordingly, there are three possible paths that may be determined. The mobile device 100 can determine these three possible paths based on the broadcasts messages 124. Furthermore, the mobile device 100 may provide an indication to the visually impaired user of the three determined paths and request input from the user including an indication of which path to traverse.

Figure 2:
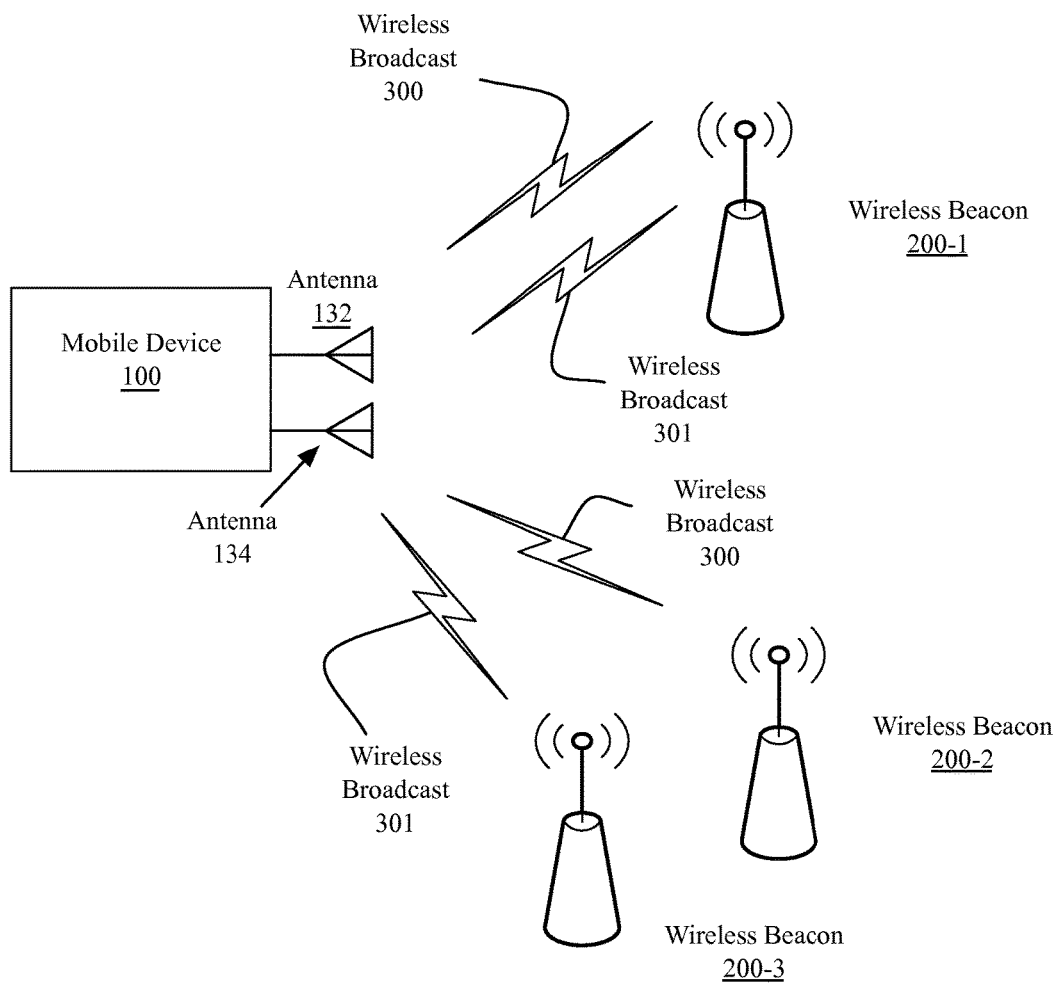

FIG. 2 is a block diagram of the system 1000 of FIG. 1 where multiple modalities of wireless broadcast are used. In particular, multiple modalities of wireless broadcasts can be implemented to increase the accuracy of proximity sensing of the mobile device 100. As depicted, the mobile device 100 is shown including the antenna 132 and an antenna 134. The antenna 132 can be configured to receive wireless broadcasts 300 as described above. Additionally, the antenna 134 can be configured to receive wireless broadcasts 301. In some implementations, one of the wireless beacons 200-a can be configured to broadcast and/or receive multiple modalities of wireless broadcasts (e.g., 300 and 301, or the like). For example, the wireless beacon 200-1 is configured to broadcast the wireless broadcasts 300 and 301.

With some implementations, multiple wireless beacons 200-a can be deployed to broadcast and/or receive the multiple modalities of wireless broadcasts (e.g., 300 and 301, or the like). For example, the wireless beacons 200-2 and 200-3 are configured to broadcast the wireless broadcasts 300 and 301, respectively.

As described above, the wireless broadcasts 300 and 301 can be any of a variety of types of wireless broadcasts, such as, for example, BLE, ZigBee, RFID, Ultrasound, or the like. In some examples, the wireless broadcast 300 may be BLE while the wireless broadcast 301 may be Ultrasound.

It is important to note, that where multiple modalities of wireless broadcasts are implemented, one of the broadcasts may originate from the mobile device. For example, the wireless broadcast 300 may be implemented using BLE and originate from the wireless beacons 200-a while the wireless broadcast 301 may be implemented using Ultrasound and originate from the mobile device 100.

Figure 3:
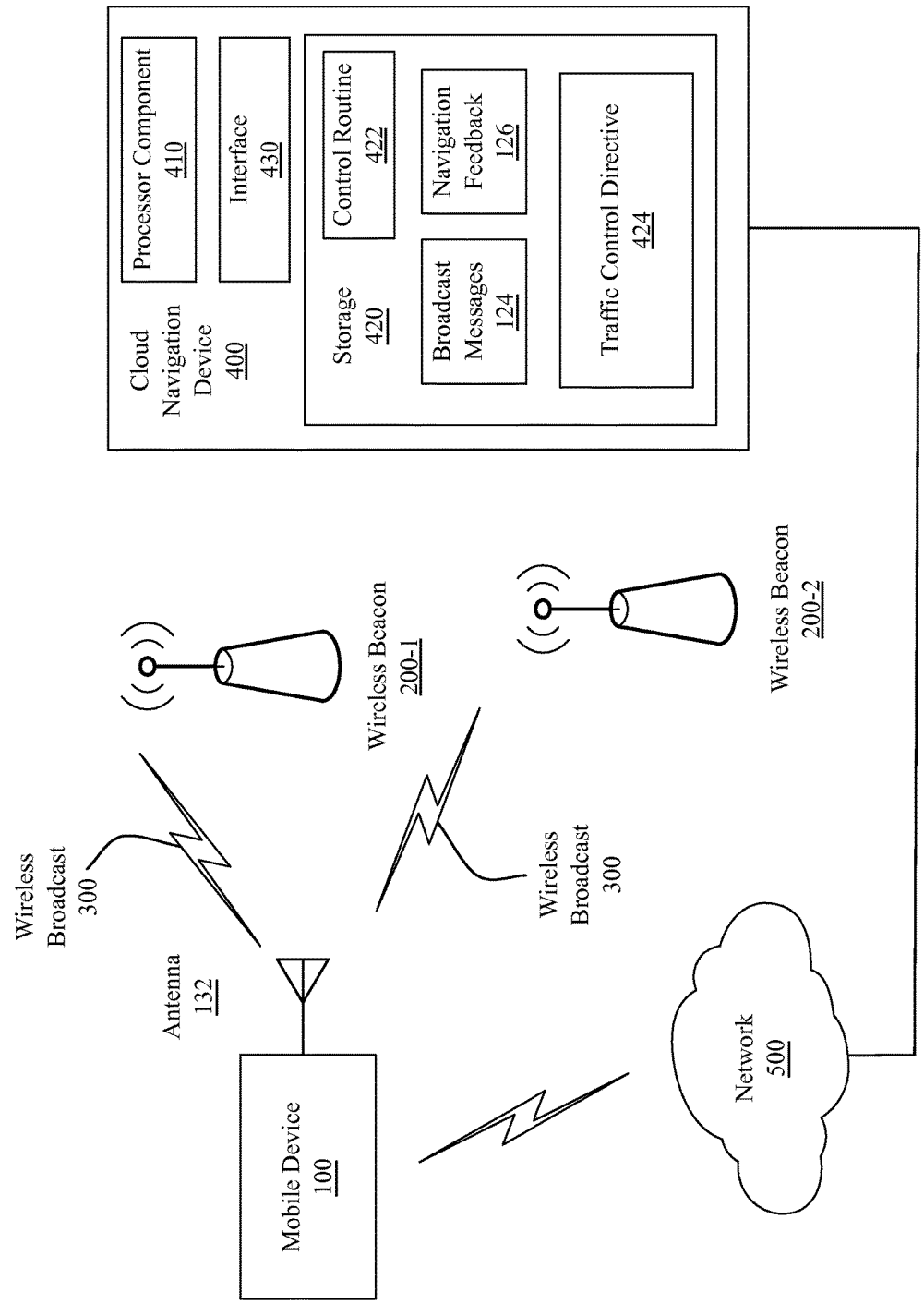

FIG. 3, a block diagram of the urban area navigation assistance system 1000 is depicted further including a cloud navigation device 400. In general, the system 100 depicted in FIG. 3 operates similar to the system 1000 depicted in FIGS. 1-2. Additionally, the system 1000 can include the cloud navigation device 400 to provide additional assistance to a visually impaired user. For example, the mobile device 100 can communicate with the cloud navigation device 400 via network 500 to communicate the received broadcast messages 124 and the navigation feedback 126 to the cloud navigation device 400. The cloud navigation device 400 is configured to control various portion of the urban area in which the visually impaired user is operating the mobile device 100. For example, the cloud navigation device 400 may cause traffic lights in an area to change and/or remain a particular color to facilitate the visually impaired user to navigate the determined pathway (refer to FIG. 7).

As depicted, the mobile device 100 and the cloud navigation device 400 may exchange signals conveying broadcast messages and navigation feedback through network 500. In various embodiments, the network 500 may be a single network possibly limited to extending within a single building or other relatively limited area, a combination of connected networks possibly extending a considerable distance, and/or may include the Internet, the Internet of Things, or the like. Thus, the network 500 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Furthermore, although the network 500 is shown as a wired network, it may in some examples be a wireless network.

The cloud navigation device 400 may include one or more of the following: a processing component 410, storage 420, and an interface 430. The storage 420 may store one or more of a control routine 422, broadcast messages 124, navigation feedback 126, and traffic control directive 424.

The cloud navigation device 400 may receive the broadcast messages 124 and navigation feedback 126 from the mobile device 100. For example, the processor component 410 may receive, via the interface 430 and network 500 the broadcast messages 124 and the navigation feedback 126.

Additionally, the cloud navigation device 400 may generate the traffic control directive 424 based on the navigation feedback 126 and the broadcast messages 124. For example, the processor component 410 may generate the traffic control directive 424 to include an indication to change a traffic signal or an indication to not change a traffic signal based on the broadcast messages 124 and the navigation feedback 126. This is described in greater detail below with respect to FIG. 7. In general, however, the mobile device 100 may communicate with the cloud navigation device 400 and based on this communication, the position of the mobile device 100 within the urban area can be determined and traffic signals (e.g., traffic lights, crosswalk lights, railroad crossings, or the like) can be controlled to assist the visually impaired user with navigating the urban area.

In various embodiments, the processor component 110 and/or the processor components 410 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked. Additionally, one or more of the processor components, and particularly the processor components 110, may be an application specific integrated circuit (ASIC), a baseband processor, or in general, any processing component or circuit configured to execute the control routine.

In various embodiments, the storage 120 and/or the storages 420 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

The feedback device 140 may be one or more of a speaker, a braille display, a haptic device, or the like. The input device 150 may be a touch sensitive device, a button, a microphone, or the like. Furthermore, the mobile device 100 may include the sensors 160. The sensors 160 may be any of a variety of sensors, for example, biometric sensors, gyroscopes, temperature sensors, light sensors, or the like.

Figure 4:
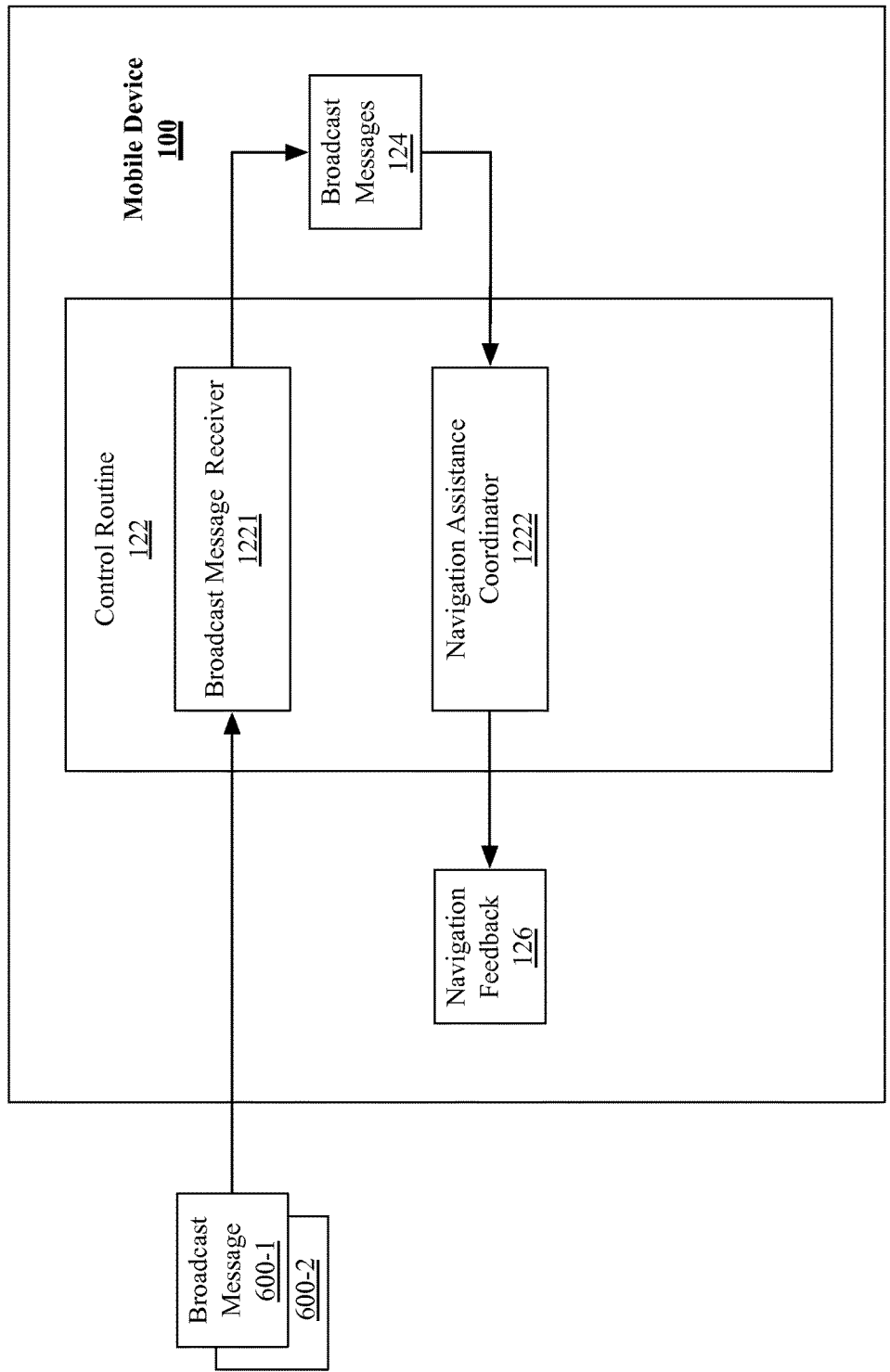
FIGS. 4-5 illustrate portions of the system of FIGS. 1-3.
Figure 5:
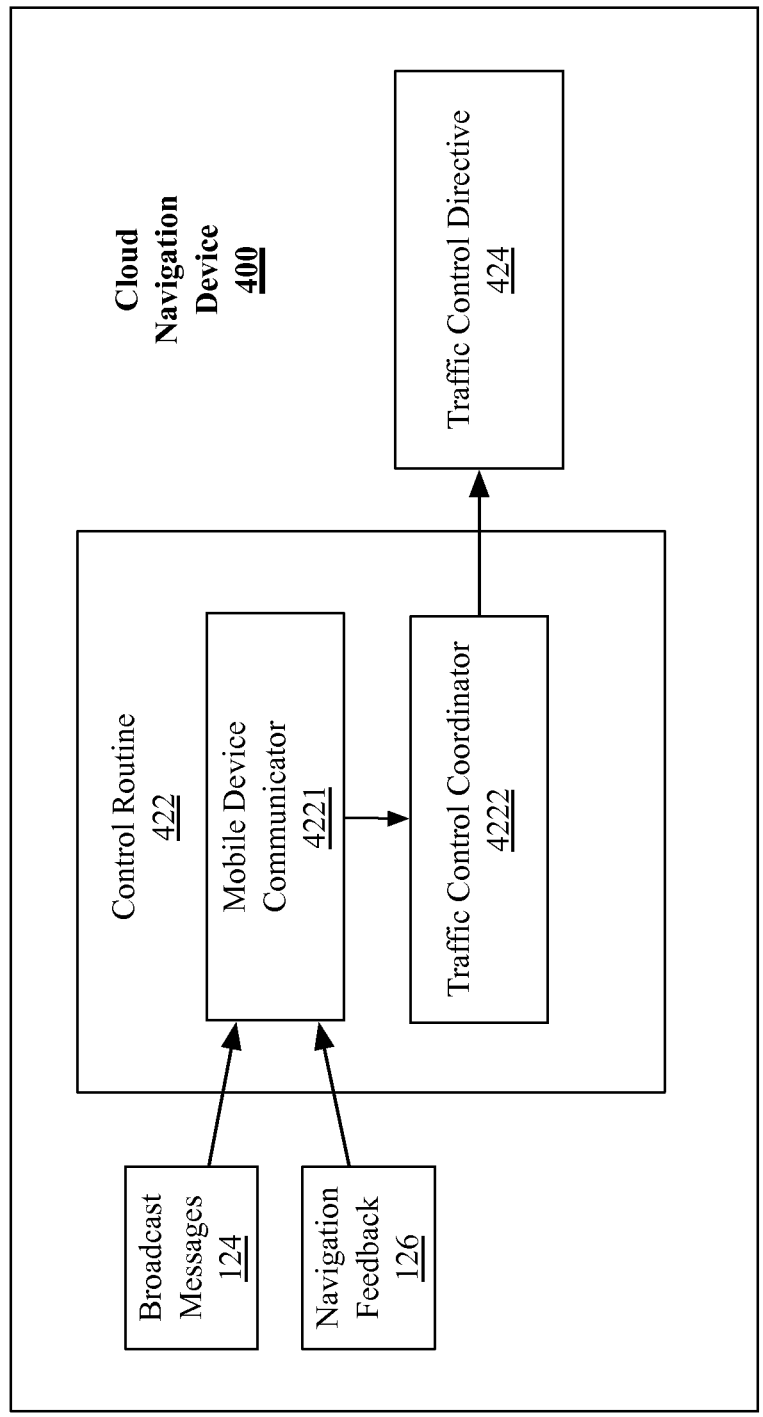

FIGS. 4-5 are block diagrams of portions of an embodiment of the system 1000 of FIGS. 1-3. In general, FIG. 4 illustrates aspects of the operation of the mobile device 100 while FIG. 5 illustrates aspects of the operation of the cloud navigation device 400. Furthermore, FIG. 6 is a block diagram illustrating an example message 600 that may be transmitted by the wireless beacons 200-1, 200-2, and/or 200-3.

In various embodiments, the control routine 122 and/or the control routine 422 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or 410. Where one or more device drivers are included, those device drivers may provide support for any of a variety of other components, whether hardware or software components, of the mobile device 100 and/or the cloud navigation device 400.

Figure 6:
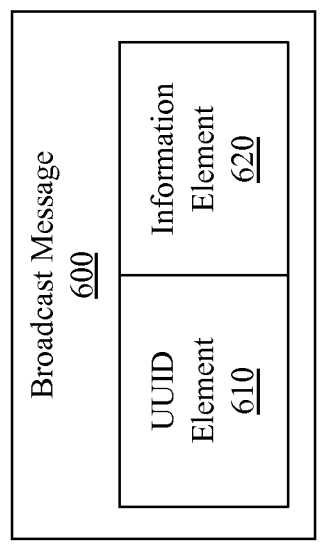
FIG. 6 illustrates an example of a message communicated in the system of FIGS. 1-3.

Turning first to FIG. 6, an example broadcast message 600 is depicted. The broadcast message 600 may correspond to messages communicated by the wireless beacons 200-1, 200-2, and/or 200-3 to the mobile device 100. In particular, the broadcast message 600 may correspond to messages communicated via wireless broadcasts 300 and/or 301. The broadcast message 600 may correspond to one of the messages represented in the broadcast messages 124. In some examples, the broadcast message 600 may be a BLE frame communicated over BLE frequencies. In particular, the broadcast message may comprise a BLE Advertising payload data unit (PDU).

As depicted, the broadcast message 600 includes a universally unique identifier (UUID) element 610 and an information element 620. The UUID element 610 may include an identifier for a particular service (e.g., visually impaired crosswalk assistance, or the like) corresponding to the broadcast messages 600. Additionally, the information element 620 may include indications of any of a variety of location and/or navigation information corresponding to the area. Furthermore, the information element may include an identifier for the particular wireless beacon 200-a. For example, the information element 620 may include an indication of a particular location (e.g., street, cross-street, building, address, geographic name location, geo-coordinates, or the like) corresponding to the location of the wireless beacon 200-*a* broadcasting the message 600.

Turning now to FIG. 4, the control routine 122 may include a broadcast receiver 1221 and a navigation assistance coordinator 1222. In general, the control routine 122 receives messages 600 that are broadcast from the wireless beacons and generates navigation feedback based on the received messages.

In particular, the broadcast message receiver 1221 may be configured to receive messages from the wireless beacons 200-1, 200-2, and/or 200-3. For example, the broadcast message receiver 1221 may send a control directive to the radio 130 to cause the radio to scan the frequency corresponding to the wireless broadcasts 300 and/or 301. For example, where the wireless beacons 200-1 and 200-2 communicate messages via BLE, the broadcast receiver 1221 may send a control directive to the radio 130 to perform a scan of the BLE frequencies. During the scan, the radio 130 can receive the broadcast messages 600-1 and 600-2 from the wireless beacons 200-1 and 200-2 via the network 300. These messages may be communicated to the broadcast message receiver 1221 and stored as the broadcast messages 124 by the broadcast message receiver 1221. For example, the broadcast receiver 1221 may sequentially hop between a number of channels (e.g., 3 BLE advertising channels, or the like) to scan for broadcast messages 600-1 and/or 600-2.

The navigation assistance coordinator 1222 may be configured to generate the navigation feedback 126 from the broadcast messages 124. In general, the navigation assistance coordinator 1222 generates a pathway (refer to FIG. 7) based on the broadcast messages 124 and also generates feedback to guide a visually impaired user along the determined pathway.

In some examples, the navigation assistance coordinator 1222 may determine the pathway between the wireless beacons, from one wireless beacon to another, or the like, based on the received broadcast messages 124. With some examples, the navigation assistance coordinator 1222 may generate audio, haptic, or other (e.g., braille, or the like) feedback appropriate for a visually impaired user to direct the visually impaired user along the determined pathway. With some examples, the navigation coordinator repeatedly receives the broadcast messages 600-1 and 600-2 and generates navigation feedback 126 based on the subsequently received messages. This is explained in greater detail below. However, the feedback may be used to guide a user along the path and may be updated to reflect a new position or location along the path (e.g., based on the user moving along the path).

Turning more specifically to FIG. 5, the cloud navigation device 400 is shown. The control routine 422 may include a mobile device communicator 4221 and a traffic control coordinator 4222. In general, the control routine 422 may communicate with the mobile device 100 and facilitate direction of traffic within the area in which the mobile device is operating to provide assistance to the visually impaired user of the mobile device 100 in navigating the area.

The mobile device communicator 4221 may receive communication from the mobile device 100 (e.g., via network 500) including indications of the broadcast messages 124 and the navigation feedback 126. With some examples, the mobile device communicator 4221 may be configured to receive the broadcast messages 124 and the navigation feedback 126 via the wireless beacons 200-*a*. For example, the mobile device 100 may be configured to both receive wireless broadcasts 300 and/or 301 from the wireless beacons 200-1, 200-2, and/or 200-3 as well transmit messages to the wireless beacon 200-1, 200-2, and/or 200-3. As such, the mobile device may communicate to the cloud navigation assistance device 400 via the wireless beacons 200-*a*. It is noted, that in general, the wireless beacons 200-*a* and the mobile device 100 may support unidirectional communication.

The traffic control coordinator 4222 may be configured to generate the traffic control directive 424 to include an indication to change or not change a traffic signal in the area in which the mobile device is operating.

In some implementations, the cloud navigation device 400 is operably coupled to backend or main traffic light control interface for a particular area. In some examples, the cloud navigation device 400 is operably coupled to one or more traffic signals proximate to (e.g., within 50 feet, within 100 feet, within 1 block, within 2 blocks, or the like) where the wireless beacons 200-*a* are deployed. As such, the cloud navigation device 400 may control traffic signals in the area in which the mobile device 100 is operating.

Figure 7:
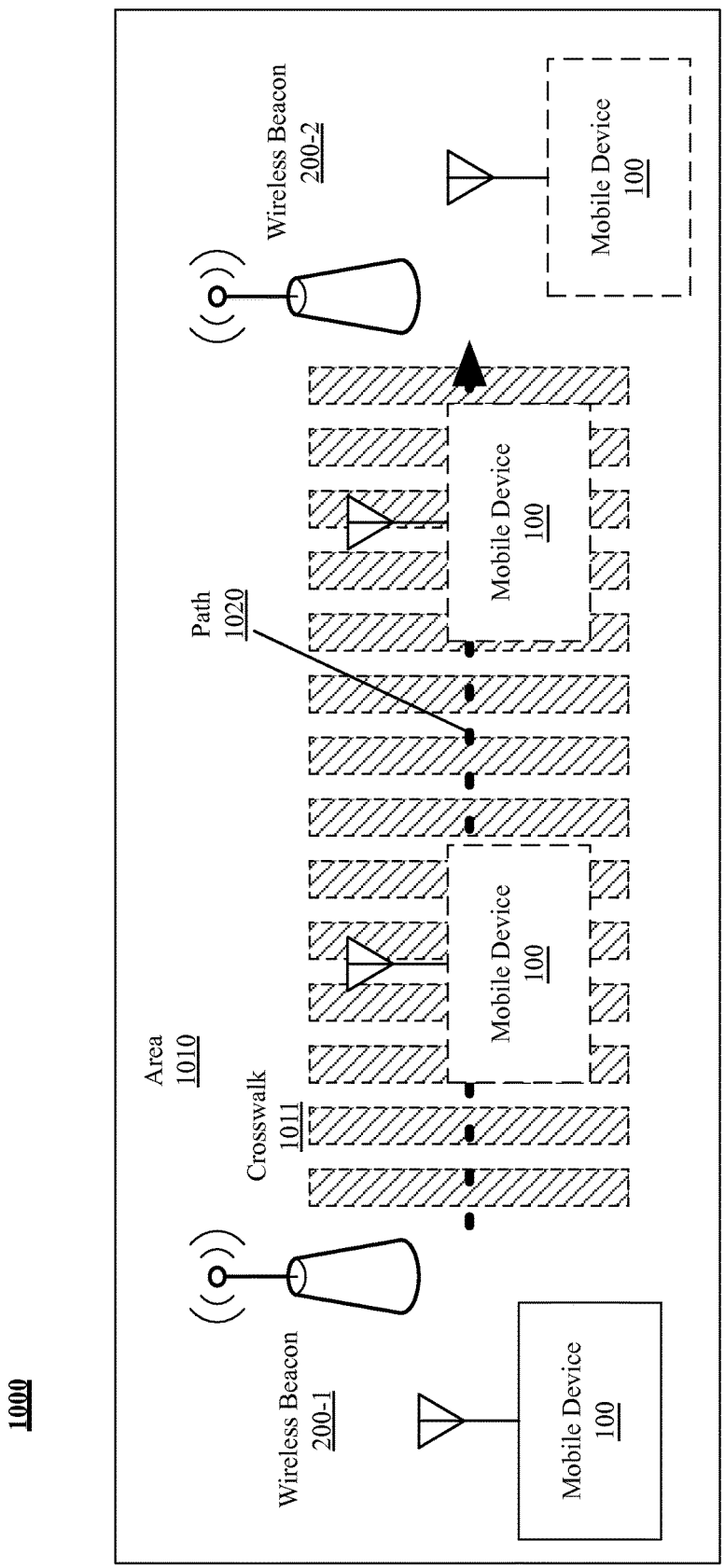
FIG. 7 illustrates an example of the system of FIGS. 1-3 implemented in an area to be navigated.

FIG. 7 illustrates an example area 1010 in which the system 1000 may be implemented. In particular, the wireless beacons may be deployed in the area 1010 to assist a visually impaired user with navigating the area 1010 as described herein. The example area 1010 corresponds to a crosswalk 1011. As noted above, the system 1000 may be implemented to assist a visually impaired user with navigating any of a variety of different urban area, including crossing at a crosswalk. As such, the example provided herein is not intended to be limiting.

As depicted, the mobile device 100 is shown at a far edge of the crosswalk 1011 (e.g., near the street, on a sidewalk, or the like). During operation, the mobile device 100 may receive broadcasts (e.g., broadcast messages 600-1, 600-2, or the like) from the wireless beacons 200-1 and 200-2 as the mobile device 100 approaches the crosswalk.

In particular, the processor component 110, in executing the control routine 122 and the broadcast message receiver 1221, may scan a particular frequency (e.g., BLE, Ultrasound, or the like) to receive the messages broadcast by the wireless beacons 200-1 and 200-2. As noted above, the broadcast messages comprise information (e.g., the information element 620) including indications of a location of the wireless beacons 200-1 and 200-2. In particular, the broadcast messages may include indications of a name of the area 1010, a name of the street over which the crosswalk 1011 crosses, or the like.

The processor component 110, in executing the control routine 122 and the navigation assistance coordinator 1222, may determine a pathway through the area 1010. For example, based on the broadcast messages 124, the navigation assistance coordinator 1222 may determine the wireless beacons 200-1 and 200-2 are on opposite sides of a street adjacent to the crosswalk 1011. As such, the navigation assistance coordinator 1222 may determine the pathway 1020 across the crosswalk 1011.

With some examples, the navigation assistance coordinator 1222 may announce a location of the mobile device 100 based on broadcast messages 124. For example, the navigation assistance coordinator 1222 may generate a control directive to the feedback device 140 to cause the feedback device 140 to announce (e.g., audibly, using braille, using haptic feedback, or the like) the particular location of the mobile device.

With some examples, the navigation assistance coordinator 1222 may additionally request or query whether navigation along the path 1020 is desired and may receive an input from the input device 150 including an indication of whether navigation along the pathway is desired.

Additionally the navigation feedback coordinator 1222 may generate feedback to guide a user along the pathway 1020. For example, the navigation feedback coordinator 1222 may use proximity sensing to direct the user along the pathway 1020. In particular, the mobile device 100 may repeatedly scan for broadcast messages as the mobile device moves along the pathway 1020 to update the position of the mobile device 100 relative to the wireless beacons and update the navigation feedback 126 accordingly.

With some examples, the navigation feedback coordinator 1222 may use comparative distance measurements to direct a user to the center point between the wireless beacons 200-1 and 200-2 and then to the wireless beacon 200-2. As such, a visually impaired user may be guided across the pathway 1020 through the area 1010.

FIGS. 8-9 illustrate examples of logic flows representative of at least some operations executed by one or more logic, features, or devices described herein. In general, the logic flows may be representative of some of all of the operations executed by logic and/or features of the update server 100 and/or the computing devices 200-a of the system 1000. In particular, FIG. 8 may be representative of operations performed by the mobile device 100 in guiding a visually impaired user through an urban area while FIG. 9 may be representative of operations performed by the cloud navigation assistance device 400 in generating traffic control directives. It is to be appreciated, that although the example logic flows are described with reference to the system 1000 and FIGS. 1-7, examples are not limited in this context.

Turning more specifically to FIG. 8, a logic flow 800 is depicted. The logic flow 800 may begin at block 810. At block 810, "receive a message from a number of wireless beacons deployed in an area via a radio" the mobile device 100 may receive the broadcast messages 600. In particular, the mobile device 100 may receive broadcast messages (e.g., the messages 600-1, 600-2, or the like) from the wireless beacons 200-a via the wireless broadcasts 300 and/or 301.

For example, the broadcast message receiver 1221 may receive signals from the wireless beacons 200-1, 200-2, and/or 200-3 via the wireless broadcasts 300 and/or 301. The signal including indications of the messages 600.

Continuing to block 820, "determine a path through the area based on the one or more received messages" the mobile device 100 may determine a path (e.g., the path 1020, or the like) through an area (e.g., the area 1010, or the like) based on the broadcast messages 124. For example, the navigation assistance coordinator 1222 may determine the path 1020 from the broadcast messages 124.

Continuing to block 830, "generate navigation feedback based on the determined path to guide a visually impaired user along the path" the mobile device 100 may generate navigation feedback to guide a visually impaired user along the path. For example, the navigation assistance coordinator 1222 may generate the navigation feedback 126 to include an indication of the path 1020 and generate control directives to cause the feedback device 140 to provide feedback to guide a visually impaired user along the path 1020.

Turning more specifically to FIG. 9, a logic flow 900 is depicted. The logic flow 900 may begin at block 910. At block 910, "receive navigation feedback from a mobile device, the navigation feedback to include an indication of a path through an area" the cloud navigation device 400 may receive navigation feedback including an indication of a path (e.g., the path 1020) through an area (e.g., the area 1010) from a mobile device. In particular, the mobile device communicator 4221 may receive the navigation feedback 126 from the mobile device 100.

Continuing to block 920, "generate a traffic control directive for one or more traffic signals in the area based on the path" the cloud navigation device 400 may generate the traffic control directive 424 based on the navigation feedback 126 and particularly the path 1020.

Figure 10:
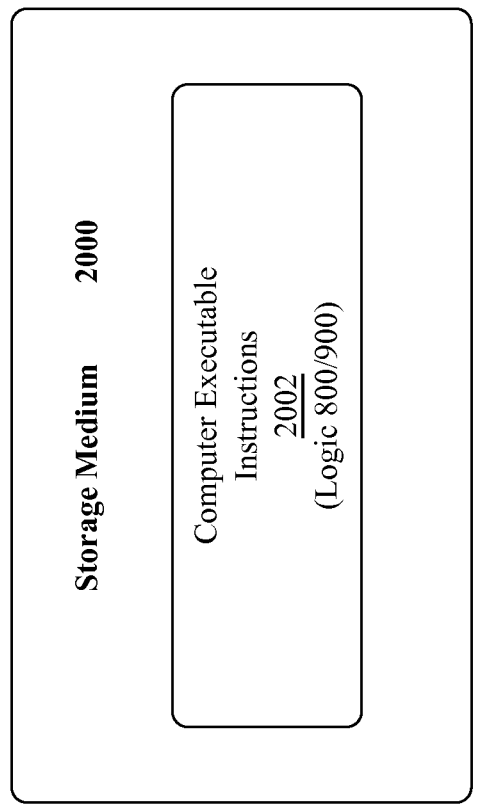
FIG. 10 illustrates one embodiment of a storage medium.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 800. In some examples, the storage medium 2000 may store various types of computer executable instructions to implement logic flow 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
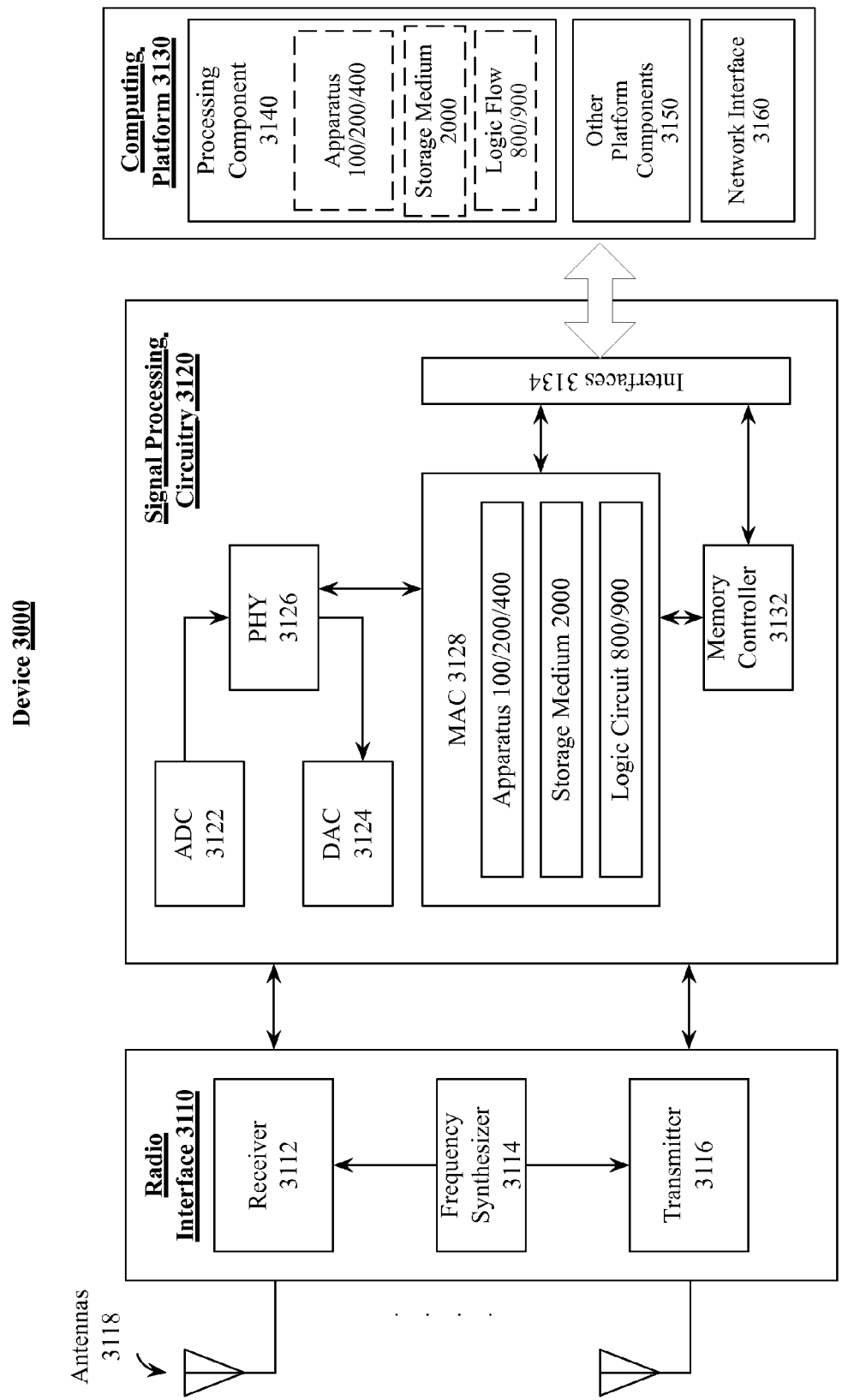
FIG. 11 illustrates an embodiment of a device.

FIG. 11 illustrates an embodiment of a device 3000. In some examples, device 3000 may be configured or arranged for wireless communications in a wireless network such as the network 500 shown in FIG. 3. In some examples, the mobile device 100 may be implemented in the device 3000. For example, the device 3000 may implement the device as apparatus 100. With some examples, the wireless beacons 200-a may be implemented in the device 3000. For example, the device 3000 may implement the beacons as apparatus 200. In some examples, the cloud navigation device 400 may be implemented in the device 3000. For example, the device 3000 may implement the device as apparatus 400.

Additionally, the device 3000 may implement storage medium 2000 and/or a logic circuit 800/900. The logic circuits may include physical circuits to perform operations described for the apparatus 100, the apparatus 200, the apparatus 400, storage medium 1400, logic flow 1200, and/or logic flow 1300. As shown in FIG. 11, device 3000 may include a radio interface 3110, baseband circuitry 3120, and computing platform 3130, although examples are not limited to this configuration. The device 3000 may implement some or all of the structure and/or operations for the apparatus 100/200/400, the storage medium 200 and/or the logic circuit 800/900 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-f. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100/200-a/400, storage medium 2000, and logic circuit 800/900 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a source or destination node in a MIMO system and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 3000 described herein; may be included or omitted in various embodiments of device 3000, as suitably desired. In some embodiments, device 3000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus to provide assistance navigating a geographic area, the apparatus comprising: circuitry; a radio operably coupled to the circuitry; a beacon receiver executable by the circuitry, the beacon receiver to receive a first message broadcast from a first wireless beacon deployed in an area via the radio and to receive a second message broadcast from a second wireless beacon deployed in the area; and a navigation assistance coordinator executable by the circuitry, the navigation assistance component to determine a path through the area based on the first and second received messages and to generate navigation feedback based on the determined path.

EXAMPLE 2

The apparatus of example 1, the navigation feedback to guide a visually impaired user along the path.

EXAMPLE 3

The apparatus of example 1, the navigation feedback to include an indication of the direction to the path.

EXAMPLE 4

The apparatus of example 3, the navigation assistance coordinator to send a control directive to a feedback device to cause the feedback device to provide the navigation feedback to include the indication of the direction of the path.

EXAMPLE 5

The apparatus of example 3, the indication of the path comprising a length of the path or an allowed time to traverse the path.

EXAMPLE 6

The apparatus example 4, wherein the feedback device comprises a speaker, a haptic device, or a braille display.

EXAMPLE 7

The apparatus of example 1, the beacon receiver to send a control directive to the radio to cause the radio to perform a background scan to detect the one or more broadcasts.

EXAMPLE 8

The apparatus of example 1, wherein at least the first message includes an indication of the area.

EXAMPLE 9

The apparatus of example 8, the indication comprising: a street name, a cross street name, a neighborhood name, or a landmark name.

EXAMPLE 10

The apparatus of any one of examples 1 to 9, the radio comprising a Wi-Fi radio, a WiGig radio, a ZigBee radio, a Bluetooth radio, a Bluetooth low energy radio, or an Ultrasound radio.

EXAMPLE 11

The apparatus of example 10, comprising an antenna operably coupled to the radio.

EXAMPLE 12

The apparatus of any one of examples 1 to 9, the circuitry comprising a baseband processor or an application processor.

EXAMPLES 13

The apparatus of any one of examples 1 to 9, the navigation assistance coordinator to generate a query including an indication or a request to traverse the path.

EXAMPLE 14

The apparatus of example 13, the navigation assistance coordinator to receive from an input device an indication of affirmation of the request to traverse the path or an indication of a denial of the request to traverse the path.

EXAMPLE 15

The apparatus of example 1, wherein the beacon receiver receives the first message via a first wireless broadcast and receives the second message via a second wireless broadcast.

EXAMPLE 16

The apparatus of example 15, wherein the first wireless broadcast is Bluetooth low energy and the second wireless broadcast is Ultrasound.

EXAMPLES 17

The apparatus of example 1, the navigation assistance coordinator to determine the path based on a comparative distance analysis between the first wireless beacon and the second wireless beacon.

EXAMPLE 18

An apparatus to provide assistance navigating a geographic area, the apparatus comprising: a processing component; a mobile device communicator for execution by the processing component, the mobile device communicator to receive navigation feedback from the mobile device, the navigation feedback to include an indication of a path through an area; and a traffic control coordinator for execution by the processing component, the traffic control coordinator to generate a traffic control directive for one or more traffic signals in the area based on the path.

EXAMPLE 19

The apparatus of example 18, comprising a network interface, the mobile device communicator to receive the navigation feedback via the network interface.

EXAMPLE 20

The apparatus of example 18, the traffic control directive to include an indication to change states of at least one of the one or more traffic signals.

EXAMPLE 21

The apparatus of example 18, the traffic control directive to include an indication to not change states of at least one of the one or more traffic signals.

EXAMPLE 22

A method implemented by mobile device, the method comprising: receiving a first message broadcast from a first wireless beacon deployed in an area via a radio; receiving a second message broadcast from a second wireless beacon deployed in the area via the radio; determining a path through the area based on the first and second received messages; and generating navigation feedback based on the determined path.

EXAMPLE 23

The method of example 22, the navigation feedback to guide a visually impaired user along the path.

EXAMPLE 24

The method of example 22, the navigation feedback to include an indication of the direction to the path.

EXAMPLE 25

The method of example 24, comprising sending a control directive to a feedback device to cause the feedback device to provide the navigation feedback to include the indication of the direction to the path.

EXAMPLE 26

The method of example 22, the navigation feedback to include an indication of a length of the path, or an allowed time to traverse the path.

EXAMPLE 27

The method example 25, wherein the feedback device comprises a speaker, a haptic device, or a braille display.

EXAMPLE 28

The method of example 22, comprising sending a control directive to the radio to cause the radio to perform a background scan to detect the one or more broadcasts.

EXAMPLE 29

The method of example 22, wherein at least the first message includes an indication of the area.

EXAMPLE 30

The method of example 29, the indication comprising: a street name, a cross street name, a neighborhood name, or a landmark name.

EXAMPLE 31

The method of any one of examples 22 to 30, the radio comprising a Wi-Fi radio, a WiGig radio, a ZigBee radio, a Bluetooth radio, a Bluetooth low energy radio, or an Ultrasound radio.

EXAMPLE 32

The method of any one of examples 22 to 30, comprising generating a query including an indication or a request to traverse the path.

EXAMPLE 33

The method of example 32, comprising receiving from an input device an indication of affirmation of the request to traverse the path or an indication of a denial of the request to traverse the path.

EXAMPLE 34

The method of example 22, comprising: receiving the first message via a first wireless broadcast; and receiving the second message via a second wireless broadcast.

EXAMPLE 35

The method of example 34, wherein the first wireless broadcast is Bluetooth low energy and the second wireless broadcast is Ultrasound.

EXAMPLE 36

The method of example 22, comprising determining the path based on a comparative distance analysis between the first wireless beacon and the second wireless beacon.

EXAMPLE 37

A method comprising: receiving navigation feedback from a mobile device, the navigation feedback to include an indication of a path through an area; and generating a traffic control directive for one or more traffic signals in the area based on the path.

EXAMPLE 38

The method of example 37, comprising receiving the navigation feedback via a network interface.

EXAMPLE 39

The method of example 37, the traffic control directive to include an indication to change states of at least one of the one or more traffic signals.

EXAMPLE 40

The method of example 37, the traffic control directive to include an indication to not change states of at least one of the one or more traffic signals.

EXAMPLE 41

An apparatus for a device in a wireless network, the apparatus comprising means to perform the method of any of examples 22 to 39.

EXAMPLE 42

At least one machine readable medium comprising a plurality of instructions that in response to being executed on a component in a wireless fingerprint location database update system cause the component to perform the method of any of examples 22 to 39.

EXAMPLE 43

An apparatus for a wireless network comprising: a processor; a radio operably connected to the processor; one or more antennas operably connected to the radio to transmit or receive wireless signals; and a memory comprising a plurality of instructions that in response to being executed by the processor cause the processor or the radio to perform the method of any of examples 22 to 39.

The invention claimed is:
1. An apparatus to provide assistance navigating a geographic area, the apparatus comprising:
   circuitry;
   a radio operably coupled to the circuitry;
   a beacon receiver executable by the circuitry, the beacon receiver to receive a first message broadcast from a first wireless beacon deployed in an area via the radio and to receive a second message broadcast from a second wireless beacon deployed in the area; and
   a navigation assistance coordinator executable by the circuitry, the navigation assistance component to determine a path through the area based on the first and the second received messages, to generate navigation feedback based on the determined path, and to provide the navigation feedback.

2. The apparatus of claim 1, the navigation feedback to guide a visually impaired user along the path.

3. The apparatus of claim 1, the navigation feedback to include an indication of the direction to the path.

4. The apparatus of claim 3, the navigation assistance coordinator to send a control directive to a feedback device to cause the feedback device to provide the navigation feedback to include the indication of the direction of the path.

5. The apparatus of claim 3, the indication of the path comprising a length of the path or an allowed time to traverse the path.

6. The apparatus claim 4, wherein the feedback device comprises a speaker, a haptic device, or a braille display.

7. The apparatus of claim 1, the beacon receiver to send a control directive to the radio to cause the radio to perform a background scan to detect the one or more broadcasts.

8. The apparatus of claim 1, wherein at least the first message includes an indication of the area.

9. The apparatus of claim 8, the indication comprising: a street name, a cross street name, a neighborhood name, or a landmark name.

10. The apparatus of claim 1, the radio comprising a Wi-Fi radio, a WiGig radio, a ZigBee radio, a Bluetooth radio, a Bluetooth low energy radio, or an Ultrasound radio.

11. The apparatus of claim 10, comprising an antenna operably coupled to the radio.

12. The apparatus of claim 1, the circuitry comprising a baseband processor or an application processor.

13. The apparatus of claim 1, the navigation assistance coordinator to generate a query including an indication or a request to traverse the path.

14. The apparatus of claim 13, the navigation assistance coordinator to receive from an input device an indication of affirmation of the request to traverse the path or an indication of a denial of the request to traverse the path.

15. The apparatus of claim 1, wherein the beacon receiver receives the first message from via a first wireless broadcast and receives the second message via a second wireless broadcast, wherein the first wireless broadcast is Bluetooth low energy and the second wireless broadcast is Ultrasound.

16. The apparatus of claim 1, the navigation assistance coordinator to determine the path based on a comparative distance analysis between the first wireless beacon and the second wireless beacon.

17. A method implemented by mobile device, the method comprising:
   receiving a first message broadcast from a first wireless beacon deployed in an area via a radio;
   receiving a second message broadcast from a second wireless beacon deployed in the area;
   determining a path through the area based on the first and the second received messages;
   generating navigation feedback based on the determined path; and
   providing the navigation feedback.

18. The method of claim 17, the navigation feedback to guide a visually impaired user along the path.

19. The method of claim 17, comprising sending a control directive to a feedback device to cause the feedback device to provide the navigation feedback to include the indication of the direction to the path, the navigation feedback to include an indication of a length of the path, or an allowed time to traverse the path and wherein the feedback device comprises a speaker, a haptic device, or a braille display.

20. At least one non-transitory machine readable medium comprising a plurality of instructions that in response to being executed by a processing component of a mobile device cause the mobile device to:
- receive a first message broadcast from a first wireless beacons deployed in an area via a radio;
- receive a second message broadcast from a second wireless beacons deployed in the area;
- determine a path through the area based on the first and the second received messages;
- generate navigation feedback based on the determined path; and
- provide the navigation feedback.

21. The at least one non-transitory machine readable medium of claim 20, the navigation feedback to guide a visually impaired user along the path.

22. The at least one non-transitory machine readable medium of claim 20, comprising instructions that cause the mobile device to send a control directive to a feedback device to cause the feedback device to provide the navigation feedback to include the indication of the direction to the path, the navigation feedback to include an indication of a length of the path, or an allowed time to traverse the path and wherein the first message is received via Bluetooth low energy.

* * * * *